Oct. 6, 1964  J. W. QUYNN  3,151,840
HYDRAULIC DRIVE
Filed March 14, 1962  2 Sheets-Sheet 1
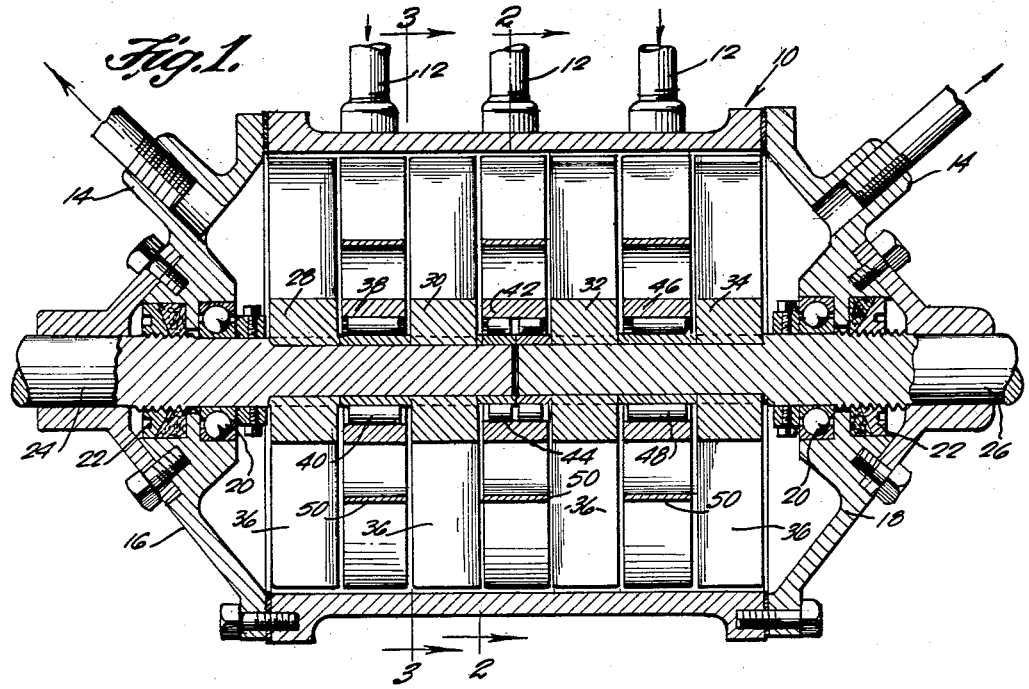
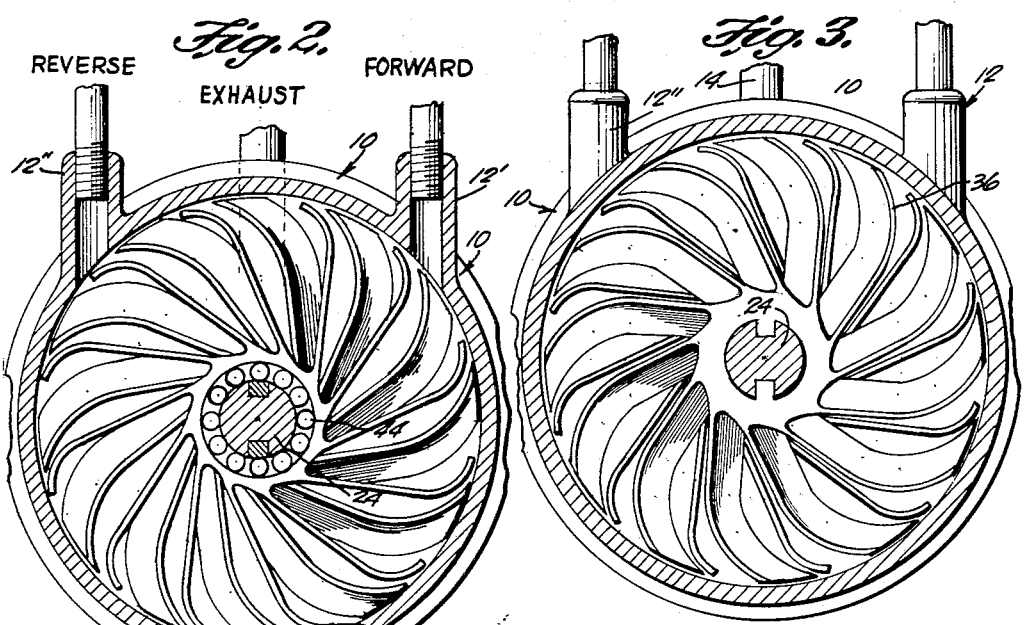
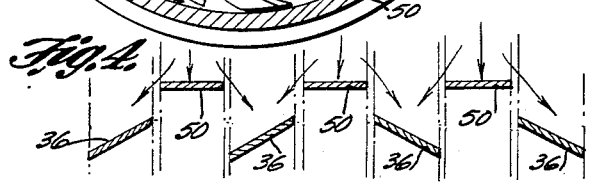
INVENTOR.
John W. Quynn,
BY
Victor J. Evans & Co.
Attorneys

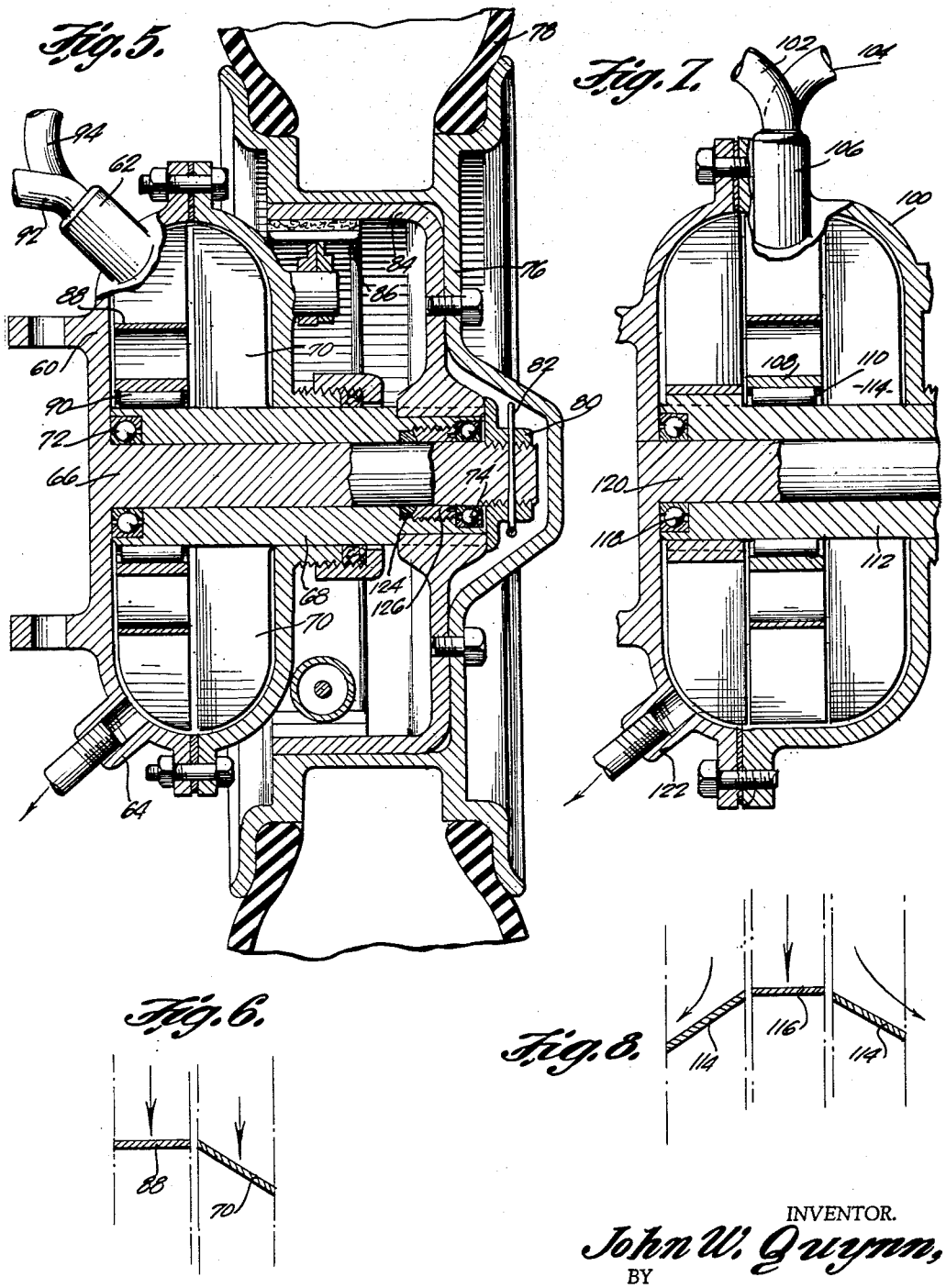

United States Patent Office 3,151,840
Patented Oct. 6, 1964

3,151,840
HYDRAULIC DRIVE
John W. Quynn, 220 E. Patrick St., Frederick, Md.
Filed Mar. 14, 1962, Ser. No. 179,617
2 Claims. (Cl. 253—23)

The present invention relates to a hydraulic drive for a vehicle or for transmitting power generally.

An object of the present invention is to provide an efficient hydraulic drive for a vehicle which lends itself to incorporation in each wheel of a vehicle, and one which lends itself also for factory use as a drive for tools and the like.

Another object of the present invention is to provide a hydraulic drive having a freely rotatable blade assembly which permits the drive to idle under conditions of low power but transmits the power efficiently at greater than idling speed to movable blades secured on a rotor.

A further object of the present invention is to provide a hydraulic drive which is simple in construction, one sturdy in construction, one foolproof in operation, and one which may be efficiently operated using mercury as the fluid in place of the usual hydraulic fluid.

With these objects in mind the invention is described as follows and in connection with the annexed drawings, in which:

FIGURE 1 is a sectional view of the hydraulic drive in a first form,

FIGURE 2 is a view taken on the line 2—2 of FIGURE 1,

FIGURE 3 is a view taken on the line 3—3 of FIGURE 1,

FIGURE 4 is a schematic view showing the relative positions of the blades of the assembly shown in FIGURES 1 to 3, FIGURE 5 is a sectional view of a modified form of the invention, shown attached to a wheel, FIGURE 6 is a schematic view of the blades of the assembly of FIGURE 5, FIGURE 7 is a sectional view of a further modification of the invention, and FIGURE 8 is a schematic view of the blades of the assembly shown in FIGURE 7.

With reference to the drawings in detail, the reference numeral 10 designates, in FIGURES 1 to 3, a casing having an inlet 12, three in number, and an outlet 14, two in number. The ends of the casing 10 are covered by end plates 16 and 18 each having a bearing assembly 20 and suitable packing assemblies 22 sealing the end plates 16 and 18 against loss of hydraulic fluid around the shafts 24 and 26, respectively.

In this form of the invention are four driven rotors, 28, 30, 32, and 34. Each of these rotors has a plurality of blades 36 projecting therefrom, each blade 36 being curved, as in FIGURE 3, and fixedly secured to the respective rotor 28, 30, 32, or 34. Such rotors are fixedly secured by keying or other means to the respective shafts 24, 26.

In the space between adjacent driven rotors 28 and 30 is a rotor 38 mounted on a roller bearing 40 which rolls about the shaft 24. In the space between the driven rotors 30 and 32 is another rotor 42 mounted on a split roller bearing assembly 44 which rolls freely about the end portions of the shafts 24 and 26. In the space between the driven rotors 32 and 34 is another rotor 46 mounted upon another roller bearing 48 rotatable about the shaft 26 as an axis.

In FIGURES 2 and 3 it will be seen that there are two inlets arranged in tandem relation and each having a tangential relation with respect to the blades within the casing 10. The inlet 12' is for forward movement of the rotor and the inlet 12" is for reverse movement of the rotor. One of the outlets 14 in the casing 10 is on the side of the rotor 34 remote from the rotor 46 and the other of the outlets 14 is on the side of the rotor 28 remote from the rotor 38.

Thus it will be seen that hydraulic fluid under pressure admitted to the casing 10 through either the inlet 12' or inlet 12" will first strike the blades 50 of the rotors 38, 42, and 46, before traveling to the side to strike the blades 36 of the driven rotors 38, 30, 32 and 34. This effects the driving of the shaft 24 and the shaft 26 to which the rotors 28, 30, and 32 and 34, are attached respectively.

In FIGURE 4 is shown schematically the angularity of the blades 36 with respect to the adjacent and intermediate blades 50.

In the form of the invention shown in FIGURE 5 the casing 60 is provided with a pair of inlets 62 and an outlet 64. A fixed axle 66 projects from the casing wall and supports thereon a rotatable sleeve 68 from which projects the blades 70 having their inner ends fixedly secured to the sleeve 68.

The one end of the sleeve 68 is supported on the bearing assembly 72 and the other end of the sleeve 68 is supported on another bearing assembly 74. A wheel 76 is keyed to the sleeve 68 and carries thereon a tire 78. A nut 80 and cotter pin 82 complete the assembly for keeping the sleeve 68 on the axle 66.

The assembly includes a brake drum 84 and a conventional hydraulic system including brake shoes 86.

In this form of the invention hydraulic fluid under pressure admitted through either of the inlets 62 will flow against blades 88 rotatably mounted on the sleeve 68 and separated therefrom by bearing assemblies 90 and then will flow against the blades 70 which are fixed to the sleeve 68 to thereby impart rotary movement to the sleeve 68 in the proper direction with respect to whether the fluid is introduced through the reverse inlet 62 or the forward inlet 62, these two inlets being in line in FIGURE 5 and only the forward one seen but identified by two conduits 92 and 94 which flow to the valve (not shown) in the control system for the apparatus of the present invention.

In FIGURE 6 the angularity of the blades 70 with respect to the blade 88 is shown.

In the final form of the invention shown in FIGURES 7 and 8, the casing 100 is shown to be supplied with hydraulic fluid under pressure through two conduits 102 and 104 through a pair of inlets 106 arranged in tandem relation and bearing the same relation to the casing 100 as the inlets 12 bear to the casing 10 as previously described.

In this form of the invention there is a freely rotatable rotor 108 mounted upon the bearing assembly 110 and rotatable about a sleeve 112 in response to the pressure of hydraulic fluid introduced through one of the inlets 106.

On each side of the rotor 108 are blade assemblies 114 which are carried by the sleeve 112 and impart movement thereto when the hydraulic fluid flows from the blades 116 which project from the rotor 108.

The sleeve 112 is mounted upon a bearing assembly 118 for support of the sleeve 112 on a fixed axle 120. The axle 120 is carried on the casing 100 and the free end of the sleeve 112 is connected to a wheel or other rotative element to be driven.

The casing 100 is provided with an outlet 122 for returning the spent hydraulic fluid back to the pump which is not shown but is the source of the hydraulic fluid under pressure.

In FIGURE 8 the angularity of the blades 114 with respect to the blades 116 is shown. As will be seen in FIGURE 4, the blades 50 of the rotor 38, rotor 42, and rotor 46 have flat faces which are parallel to the axis of rotation of the respective rotors. The blades 88 of FIGURE 6 and the blades 116 of FIGURE 8 are similarly shaped and disposed.

A seal 124 and gland nut 126 adjacent the bearing 74 prevent leakage of hydraulic fluid from between the sleeve 68 and shaft 66.

In use, in either form of the invention shown or described, hydraulic fluid is introduced to the respective casing to strike against the freely movable blades 50, 88, or 116. The hydraulic fluid flows sideways out of the blades into the blades which are fixed to the rotative member to impart rotary movement thereto.

Due to the provision of the double inlets, the rotative element in each of the forms of the invention may be driven in either forward direction or in a reverse direction.

While only preferred forms of the invention are here shown and described it is anticipated that other forms of the invention may be utilized and that numerous changes and modifications may be made therein without departing from the spirit of the invention as set forth in the appended claims.

What is claimed is:

1. In a hydraulic drive device including a casing having an outlet, a rotatable shaft extending through said casing, a driven rotor carried on said shaft for rotation therewith, and a plurality of blades carried on said rotor, a second rotor mounted on said shaft adjacent said driven rotor for free rotation around said shaft as an axis, a plurality of spaced flat blades projecting from said second rotor, said last mentioned blades having their faces parallel to the axis of rotation of said last mentioned rotor, said casing being provided with a pair of inlets arranged in tandem spaced relation, said second rotor blades being in turn in registry with said casing inlets, said driven rotor blades being in turn in registry with said casing outlet.

2. A hydraulic drive device comprising a generally stationary cylindrical casing having end closures, a shaft rotatably journaled in said end closures and extending through the casing, a plurality of spaced driven rotors mounted on such shaft for rotation therewith, each of said driven rotors including a plurality of blades thereon, a freely rotatable rotor mounted on such shaft in between each pair of driven rotors for free rotation in relation to the shaft and driven rotors, each freely rotatable rotor including a plurality of spaced flat blades projecting therefrom with the faces of the blades being substantially parallel to the axis of rotation of the shaft, said casing having an outlet in each end plate, and inlet arranged tangentially in said casing for each freely rotatable rotor for causing free rotation thereof and directing fluid power into the driven rotors for causing rotation of the shaft, certain of said inlets being tangentially arranged in relation to the casing at opposite sides thereof for driving the shaft in either a forward or reverse direction.

References Cited in the file of this patent

UNITED STATES PATENTS

| | | |
|---|---|---|
| 660,317 | Sims | Oct. 23, 1900 |
| 953,241 | Thomson | Mar. 29, 1910 |
| 1,434,336 | Geiger | Oct. 31, 1922 |
| 1,461,422 | Jolly et al. | July 10, 1923 |
| 1,945,373 | Nolan | Jan. 30, 1934 |
| 2,451,944 | Hall | Oct. 19, 1948 |
| 2,555,312 | Bollay | June 5, 1951 |
| 2,678,537 | Stalker | May 18, 1954 |

FOREIGN PATENTS

| | | |
|---|---|---|
| 539,882 | France | Apr. 8, 1922 |
| 893,117 | Germany | Oct. 12, 1953 |